Patented Oct. 29, 1929

1,733,795

UNITED STATES PATENT OFFICE

J BIRCHARD GREEN, OF CHICAGO, ILLINOIS

ROD FOR USE IN ARC WELDING OR CUTTING

No Drawing.  Application filed February 10, 1927. Serial No. 167,376.

My invention pertains to materials applied to the surface or otherwise of metallic filler material as used in arc welding and cutting.

The object of my invention is to provide means for regulating the arc voltage drop.

The heat of the arc is represented by the watts of electrical energy transformed and as this depends on both the voltage drop and amperes current flowing, it is possible to control the heat through control of the voltage. In metallic arc welding, for example, the customary voltage is about 20. In the coatings as applied to such electrodes, it is often desirable to introduce materials for the purpose of giving stability or characteristics to the resultant slag, or freedom from blowholes and many other items which must be controlled. In so doing, the resultant coating at times offers so little resistance that when holding the short arc length necessary to avoid excessive damage to the metal in transfer due to air contact, it is not possible to transform the desired wattage of electrical to heat energy.

I have discovered that by introducing compounds of aluminum, such as aluminum oxide and the like, the voltage drop can be substantially increased. Again, the voltage drop may be satisfactory for ordinary welding but excessive penetration or melting of the parent metal is required for certain work and this can be done by the same means starting with an electrode that gives what is considered a normal voltage drop.

This effect will not be noticeable unless the aluminum compound is used in appreciable quantities or in an appreciable coating. The aluminum oxide or aluminum compound should be used in such quantity as to substantially increase the voltage drop across an arc of proper welding length. An arc of proper welding length is the longest arc wherein substantially all the metal is transferred by capillary attraction.

I claim:

1. In association with filler material for arc welding and cutting, an appreciable coating containing an aluminum oxide compound which is present in sufficient amount to substantially increase the arc voltage drop.

2. The method of welding which consists in striking an arc between metallic filler material and the work and introducing aluminum oxide in the arc.

In testimony whereof I have hereunto subscribed my name.

J BIRCHARD GREEN.

DISCLAIMER 1,733,795.—*J Birchard Green*, Chicago, Ill. ROD FOR USE IN ARC WELDING OR CUTTING. Patent dated October 29, 1929. Disclaimer filed October 15, 1932, by the patentee and the assignee, *Franklin M. Warden*.

Hereby disclaim from the scope of claim 2 of said patent all methods of welding wherein the amount of aluminum oxide introduced into the welding arc is insufficient to substantially increase the arc voltage drop.

[*Official Gazette November 15, 1932.*]